(12) United States Patent
Ueda et al.

(10) Patent No.: US 8,076,040 B2
(45) Date of Patent: Dec. 13, 2011

(54) DIRECT OXIDATION FUEL CELL

(75) Inventors: Hideyuki Ueda, Osaka (JP); Masahiro Takada, Shizuoka (JP)

(73) Assignee: Panasonic Corporation, Osaka (JP)

(*) Notice: Subject to any disclaimer, the term of this patent is extended or adjusted under 35 U.S.C. 154(b) by 864 days.

(21) Appl. No.: 12/116,675

(22) Filed: May 7, 2008

(65) Prior Publication Data

US 2008/0286617 A1 Nov. 20, 2008

(30) Foreign Application Priority Data

May 14, 2007 (JP) .................................. 2007-128461

(51) Int. Cl.
*H01M 8/02* (2006.01)
(52) U.S. Cl. ..................... 429/457; 429/400; 429/456
(58) Field of Classification Search .................. 429/400, 429/456, 457
See application file for complete search history.

(56) References Cited

FOREIGN PATENT DOCUMENTS

| JP | 2002-184428 | 6/2002 |
|---|---|---|
| JP | 2006-202570 | 8/2006 |

*Primary Examiner* — Jane Rhee
(74) *Attorney, Agent, or Firm* — McDermott Will & Emery LLP

(57) ABSTRACT

A direct oxidation fuel cell of this invention has at least one unit cell including: a membrane-electrode assembly comprising an electrolyte membrane sandwiched between an anode and a cathode, each of the anode and the cathode including a catalyst layer and a diffusion layer; an anode-side separator with a fuel flow channel for supplying a fuel to the anode; and a cathode-side separator with an oxidant flow channel for supplying an oxidant containing oxygen gas to the cathode. The fuel flow channel and the oxidant flow channel are so structured that the concentration of the oxygen gas in the oxidant flow channel is higher at a part opposing an upstream part of the fuel flow channel than at a part opposing a downstream part of the fuel flow channel.

7 Claims, 5 Drawing Sheets

DIRECT OXIDATION FUEL CELL

FIELD OF THE INVENTION

The invention relates to direct oxidation fuel cells, which directly use a fuel without reforming it into hydrogen.

BACKGROUND OF THE INVENTION

With the advancement of ubiquitous network society, there is a large demand for mobile devices such as cellular phones, notebook personal computers, and digital still cameras. As the power source for mobile devices, it is desired to put fuel cells, which do not have to be recharged and can continuously supply power to devices if get refueled, into practical use as early as possible.

Among fuel cells, direct oxidation fuel cells, which generate power by directly supplying an organic fuel such as methanol or dimethyl ether to an anode for oxidation without reforming it into hydrogen, are actively studied and developed. Direct oxidation fuel cells are receiving attention in terms of the high theoretical energy densities of organic fuels, system simplification, ease of fuel storage, etc.

A direct oxidation fuel cell has a unit cell composed of a membrane-electrode assembly (hereinafter referred to as an MEA) sandwiched between separators. The MEA is composed of a solid polymer electrolyte membrane sandwiched between an anode and a cathode, and each of the anode and the cathode includes a catalyst layer and a diffusion layer. Such a direct oxidation fuel cell generates power by supplying a fuel and water to the anode and supplying an oxidant to the cathode.

For example, the electrode reactions of a direct methanol fuel cell (hereinafter referred to as a DMFC), which uses methanol as the fuel, are as follows.

Anode: $CH_3OH + H_2O \rightarrow CO_2 + 6H^+ + 6e^-$

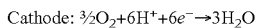

Cathode: $\frac{3}{2}O_2 + 6H^+ + 6e^- \rightarrow 3H_2O$

On the anode, methanol reacts with water to produce carbon dioxide, protons, and electrons. The protons migrate to the cathode through the electrolyte membrane, and the electrons migrate to the cathode through an external circuit. On the cathode, these protons and electrons combine with oxygen gas to form water.

However, practical utilization of DMFCs has some problems.

One of the problems relates to durability. The power generating performance of DMFCs degrades in an initial stage, and the main cause of this initial degradation is assumed to be an increase in cathode overvoltage. The increase in cathode overvoltage occurs probably because water accumulates inside the catalyst layer of the cathode or at the interface between the catalyst layer and the diffusion layer of the cathode with time of power generation, thereby lowering the diffusibility of oxygen gas. Further, this initial degradation is largely affected by methanol crossover (hereinafter referred to as MCO), which is a phenomenon of permeation of unreacted methanol through the electrolyte membrane to the cathode. An increase in MCO causes an increase in cathode activation overvoltage. Further, carbon dioxide gas produced by oxidation reaction of such crossover methanol further lowers the diffusibility of oxygen gas. As a result, the power generation performance degrades significantly.

Such initial degradation tends to occur in the power generating region opposing the upstream part of the fuel flow channel where a large amount of MCO occurs, and is evident particularly when the concentration of oxygen gas at the part of the oxidant flow channel opposing the upstream part of the fuel flow channel is low. That is, it is thought that the initial degradation tends to occur when the flow direction of fuel is opposite to the flow direction of oxidant. It should be noted that direct oxidation fuel cells are usually structured so that the flow direction of fuel is opposite to the flow direction of oxidant in the same manner as fuel cells using hydrogen gas as the fuel. Such structure is intended to make the current density uniform in the power generating region where an anode and a cathode oppose each other with an electrolyte membrane therebetween in consideration of the balance of overvoltage.

One approach to reducing the initial degradation is to supply a large amount of oxidant to the cathode. However, this approach requires upsizing of an oxidant supply means such as an air pump or blower, and the upsizing requires additional electric power. Further, if the amount of oxidant supply is increased too much, the polymer electrolyte in the solid polymer electrolyte membrane and catalyst layers of the MEA becomes dry, so that the proton conductivity lowers. As a result, the power generating characteristics degrade significantly.

Also, with respect to the flow direction of fuel and the flow direction of oxidant, a large number of proposals have been made for solid polymer electrolyte fuel cells (hereinafter referred to as PEFCs).

For example, Japanese Laid-Open Patent Publication No. 2006-02570 (Document 1) discloses a fuel cell in which the opposing flow region where the flow direction of fuel through the fuel flow channel is opposite to the flow direction of oxidant through the oxidant flow channel accounts for not less than 70% of the power generating region, provided that the projected area of the power generating region is 100%.

Japanese Laid-Open Patent Publication No. 2002-184428 (Document 2) discloses a fuel cell in which the laminating direction of its unit cells is perpendicular to the gravity direction and inlets and outlets of fuel gas and oxidant gas and gas flow channels are arranged so that the humidity distribution in the anode-side reaction area is opposite to the humidity distribution in the cathode-side reaction area.

However, the above-described conventional art cannot suppress an increase in overvoltage in the part of the cathode-side power generating region opposing the upstream part of the fuel flow channel where a large amount of MCO occurs. It is thus difficult to provide a direct oxidation fuel cell with excellent durability.

As in the techniques represented by Documents 1 and 2, in order to make the water distribution in the power generating region uniform, the flow direction of fuel and the flow direction of oxidant can be made opposite to circulate the moisture inside the power generating region. However, such techniques cannot provide drastic measures to suppress an increase in overvoltage in the part of the cathode-side power generating region opposing the upstream part of the fuel flow channel.

The invention solves the above-discussed problems associated with conventional art and intends to provide a direct oxidation fuel cell with excellent durability.

BRIEF SUMMARY OF THE INVENTION

A fuel cell of the invention has at least one unit cell including: a membrane-electrode assembly comprising an electrolyte membrane sandwiched between an anode and a cathode, each of the anode and the cathode including a catalyst layer and a diffusion layer; an anode-side separator with a fuel flow channel for supplying a fuel to the anode; and a cathode-side separator with an oxidant flow channel for supplying an oxidant containing oxygen gas to the cathode. The fuel flow channel and the oxidant flow channel are so structured that the concentration of the oxygen gas in the oxidant flow channel is higher at a part opposing an upstream part of the fuel flow channel than at a part opposing a downstream part of the fuel flow channel.

In the conventional structure of fuel cells, the flow direction of fuel is opposite to the flow direction of oxidant, i.e., the concentration of the oxygen gas in the oxidant flow channel is lower at a part opposing an upstream part of the fuel flow channel than at a part opposing a downstream part of the fuel flow channel. However, the present inventors have found that the durability of a fuel cell can be improved by making the concentration of the oxygen gas in the oxidant flow channel higher at a part opposing an upstream part of the fuel flow channel than at a part opposing a downstream part of the fuel flow channel.

In one embodiment of the invention, the flow direction of fuel and the flow direction of oxidant are preferably the same. That is, it is preferable that the upstream part of the fuel flow channel and the upstream part of the oxidant flow channel oppose each other.

In this case, it is more preferable that the flow direction of fuel and the flow direction of oxidant be the same as the gravity direction (the direction of gravitational force). That is, it is preferable that the upstream part of the fuel flow channel and the upstream part of the oxidant flow channel be positioned upward in the gravity direction, and that the downstream part of the fuel flow channel and the downstream part of the oxidant flow channel be positioned downward in the gravity direction.

As used herein, the flow direction of fuel and the flow direction of oxidant refer to the average direction of overall fuel flow and the average direction of overall oxidant flow in the power generating region, rather than the direction of flow along the fuel flow channel and the oxidant flow channel. For example, when a fuel inlet and a fuel outlet are provided in opposing first and second ends of a fuel cell, respectively, the direction from the first end toward the second end is the flow direction of fuel. This holds true for the flow direction of oxidant.

The upstream part of the fuel flow channel as used herein refers to the fuel-inlet-side quarter (about ¼) of the anode power generating region (the region of the separator in contact with the anode) in the flow direction of fuel, and the downstream part of the fuel flow channel refers to the fuel-outlet-side quarter (about ¼) of the anode power generating region. Specifically, when the area of the anode power generating region is defined as T, the upstream part of the fuel flow channel as used herein refers to the area about T/4 of the anode power generating region on the fuel inlet side, and the downstream part of the fuel flow channel refers to the area about T/4 of the anode power generating region on the fuel outlet side. This holds true for the oxidant flow channel.

In another embodiment of the invention, preferably, the flow direction of fuel is opposite to the flow direction of oxidant, and the oxidant with a high oxygen gas concentration is supplied to the part of the oxidant flow channel opposing the upstream part of the fuel flow channel. That is, it is preferable that the upstream part of the fuel flow channel and the downstream part of the oxidant flow channel oppose each other, that the downstream part of the fuel flow channel and the upstream part of the oxidant flow channel oppose each other, and that the downstream part of the oxidant flow channel have a second oxidant inlet to which the oxidant with a high oxygen gas concentration is supplied.

Also, the invention relates to a method for operating a direct oxidation fuel cell having at least one unit cell, the unit cell including: a membrane-electrode assembly comprising an electrolyte membrane sandwiched between an anode and a cathode, each of the anode and the cathode including a catalyst layer and a diffusion layer; an anode-side separator with a fuel flow channel for supplying a fuel to the anode; and a cathode-side separator with an oxidant flow channel for supplying an oxidant containing oxygen gas to the cathode. In this operation method, the fuel and the oxidant are supplied to the fuel flow channel and the oxidant flow channel, respectively, so that the concentration of the oxygen gas in the oxidant flow channel is higher at the part opposing the upstream part of the fuel flow channel than at the part opposing the downstream part of the fuel flow channel.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

With reference to drawings, the invention is hereinafter described by way of embodiments, but these embodiments are not to be construed as limiting in any way the invention.

Embodiment 1

A direct oxidation fuel cell of the invention has at least one unit cell including: a membrane-electrode assembly including an electrolyte membrane sandwiched between an anode and a cathode; an anode-side separator in contact with the anode; and a cathode-side separator in contact with the cathode. Each of the anode and the cathode includes a catalyst layer and a diffusion layer. The face of the anode-side separator in contact with the anode has a fuel flow channel for supplying a fuel to the anode. The face of the cathode-side separator in contact with the cathode has an oxidant flow channel for supplying an oxidant containing oxygen gas to the cathode.

In the direct oxidation fuel cell of the invention, the fuel and the oxidant are supplied to the fuel flow channel and the oxidant flow channel, respectively, so that the concentration of the oxygen gas in the oxidant flow channel is higher at the part opposing the upstream part of the fuel flow channel than at the part opposing the downstream part of the fuel flow channel.

Figure 1:
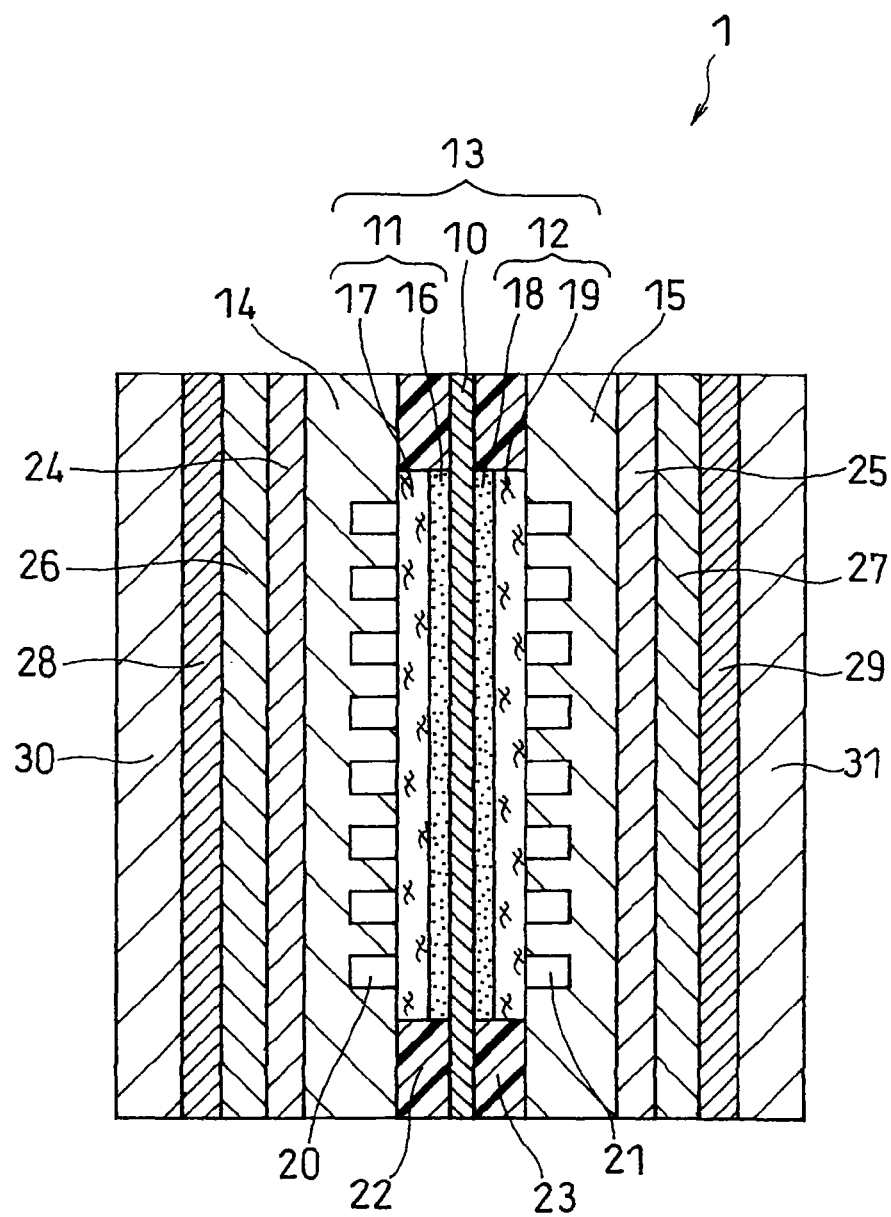
FIG. 1 is a schematic longitudinal sectional view of the structure of a direct oxidation fuel cell according to one embodiment of the invention.
Figure 2:
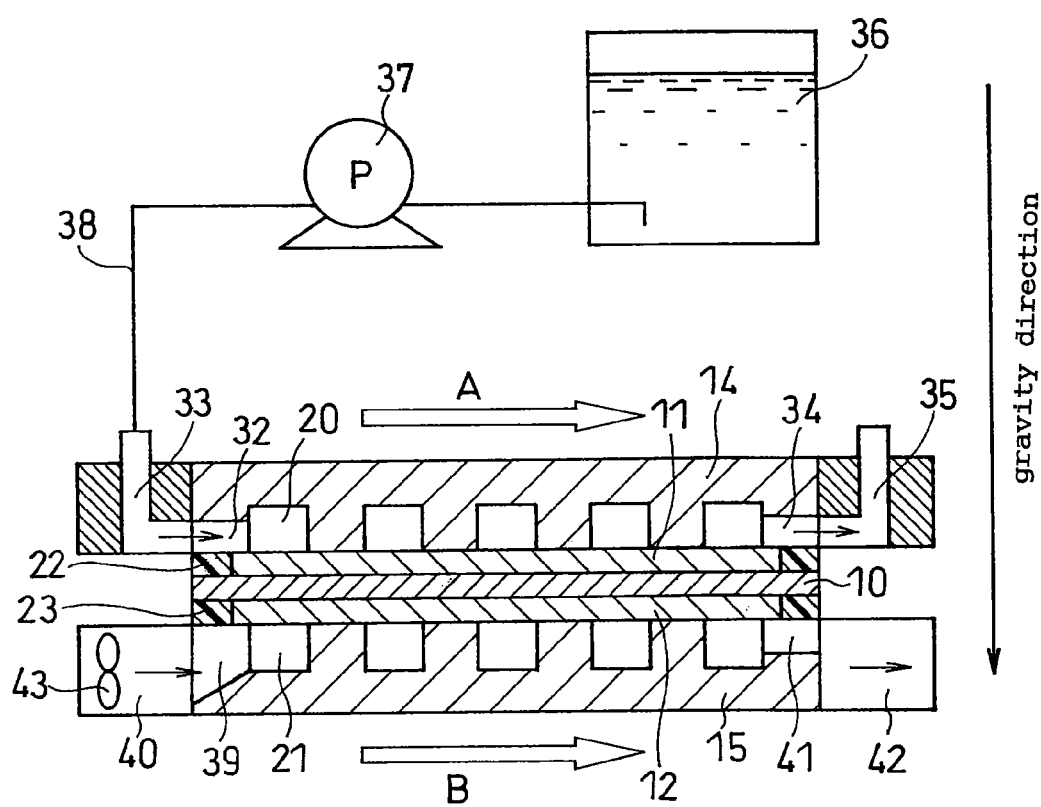
FIG. 2 is a schematic view showing the relation between the flow direction of fuel, the flow direction of oxidant, and the gravity direction in a direct oxidation fuel cell according to one embodiment of the invention.

FIGS. 1 and 2 illustrate a direct oxidation fuel cell according to one embodiment of the invention. In the fuel cell of this embodiment, the upstream part of the fuel flow channel and the upstream part of the oxidant flow channel oppose each other, the flow direction of fuel and the flow direction of oxidant are the same, and the flow direction of fuel and the flow direction of oxidant are perpendicular to the gravity direction.

The fuel cell of FIG. 1 is composed of a unit cell 1. The unit cell 1 includes a membrane-electrode assembly (MEA) 13 composed of an electrolyte membrane 10 and an anode 11 and a cathode 12 sandwiching the electrolyte membrane 10, and an anode-side separator 14 and a cathode-side separator 15 sandwiching the MEA 13.

The anode 11 includes an anode catalyst layer 16 in contact with the electrolyte membrane 10 and an anode diffusion layer 17 facing the anode-side separator 14. The cathode 12 includes a cathode catalyst layer 18 in contact with the electrolyte membrane 10 and a cathode diffusion layer 19 facing the cathode-side separator 15.

Around the anode 11 and the cathode 12, gaskets 22 and 23 are disposed, respectively, so as to sandwich the electrolyte membrane 10, in order to prevent leakage of the fuel, oxidant, and reaction products. Further, in the fuel cell of FIG. 1, the separators 14 and 15 are sandwiched between current collector plates 24 and 25, sheet heaters 26 and 27, insulator plates 28 and 29, and end plates 30 and 31, respectively. The unit cell 1 is secured by clamping means (not shown).

The electrolyte membrane 10 is preferably excellent in proton conductivity, heat resistance, chemical stability, etc. As long as the electrolyte membrane 10 has these characteristics, the material (polymer electrolyte) of the electrolyte membrane 10 is not particularly limited.

Each of the anode catalyst layer 16 and the cathode catalyst layer 18 is a thin film with a thickness of approximately 10 to 100 μm, composed mainly of a polymer electrolyte and conductive carbon particles carrying catalyst metal fine particles or catalyst metal fine particles. The catalyst metal of the anode catalyst layer 16 can be, for example, a platinum (Pt)-ruthenium (Ru) alloy in the form of fine particles. The catalyst metal of the cathode catalyst layer 18 can be, for example, Pt in the form of fine particles. The polymer electrolyte contained in each catalyst layer is preferably the same as the material of the electrolyte membrane 10.

The anode-side separator 14 has, on the face opposing the anode 11, a flow channel 20 for supplying a fuel to the anode and discharging unused fuel and reaction product. The cathode-side separator 15 has, on the face opposing the cathode 12, an oxidant flow channel 21 for supplying an oxidant to the cathode and discharging unused oxidant and reaction product.

While the shape of the fuel flow channel and the oxidant flow channel is not particularly limited, it is preferably a serpentine path through the whole power generating region. The width of each flow channel is preferably 0.5 to 5 mm. Also, when two or more flow channels are provided, the interval between the flow channels is preferably 0.5 to 5 mm. This can reduce the pressure loss of fuel flowing through the fuel flow channel and the pressure loss of oxidant flowing through the oxidant flow channel while securing electronic conductivity. Further, this can facilitate the supply of fuel from the fuel flow channel to the power generating region, the supply of oxidant from the oxidant flow channel to the power generating region, and the removal of reaction products from the power generating region.

FIG. 2 shows one example of the relation between the flow direction of fuel, the flow direction of oxidant, and the gravity direction in a direct oxidation fuel cell of this embodiment. In the fuel cell of FIG. 2, as described above, the flow direction of fuel (arrow A) and the flow direction of oxidant (arrow B) are the same, and the fuel cell is placed so that the flow directions of fuel and oxidant are perpendicular to the gravity direction. It should be noted that FIG. 2 illustrates only the MEA sandwiched between the separators, and that the other constituent components of the fuel cell are omitted. This holds true for the following drawings.

In FIG. 2, a fuel inlet 32 in the anode-side separator 14 and an oxidant inlet 39 in the cathode-side separator 15 are positioned on the same side of the unit cell. A fuel outlet 34 in the anode-side separator 14 and an oxidant outlet 41 in the cathode-side separator 15 are positioned on the opposite side from the side with the fuel inlet 32 and the oxidant inlet 39. In the fuel cell of this embodiment, the upstream part of the fuel flow channel 20 is opposed to the upstream part of the oxidant flow channel 21, and the downstream part of the fuel flow channel 20 is opposed to the downstream part of the oxidant flow channel 21. That is, the flow direction of fuel and the flow direction of oxidant are the same.

In this embodiment, as long as the flow direction of fuel and the flow direction of oxidant are the same, the positions of the fuel inlet, the fuel outlet, the oxidant inlet, and the oxidant outlet are not limited to those described above.

The fuel inlet 32 is connected to a fuel supply section 33 in an external manifold installed on the periphery of the unit cell. The fuel outlet 34 is connected to a fuel discharge section 35 in an external manifold installed on the periphery of the unit cell.

A fuel tank 36 contains a fuel such as a methanol or dimethyl ether aqueous solution having a predetermined concentration. The fuel in the fuel tank 36 is supplied to a fuel supply section 33 through a supply pipe 38 at a predetermined flow rate by a pump 37. Thereafter, the fuel flows through the power generating region, meandering along the fuel flow channel 20 of the anode-side separator 14. The fuel as a whole moves in the fuel flow direction A, which is perpendicular to the gravity direction. Surplus fuel not utilized in power generation and carbon dioxide (reaction product) are discharged from the fuel discharge section 35.

The oxidant inlet 39 is connected to an oxidant supply section 40 in an external manifold installed on the periphery of the unit cell. The oxidant outlet 41 is connected to an oxidant discharge section 42 in an external manifold installed on the periphery of the unit cell.

An oxidant containing oxygen gas is supplied to an oxidant supply section 40 by using, for example, an oxidant supply unit 43 such as a fan. The oxidant flows through the power generating region, meandering along the oxidant flow channel 21 of the separator 15. The oxidant as a whole moves in the oxidant flow direction B, which is perpendicular to the gravity direction. Surplus oxidant not utilized in power generation and produced water are discharged from the oxidant discharge section 42. As the oxidant, for example, a mixed gas containing oxygen gas, such as air, is used.

In this embodiment, the concentration of the oxygen gas contained in the oxidant lowers as the oxidant flows down through the oxidant flow channel. Hence, the concentration of the oxygen gas in the oxidant flow channel is higher at the part opposing the upstream part of the fuel flow channel than at the part opposing the downstream part of the fuel flow channel.

As described above, the concentration of the oxygen gas in the oxidant flow channel is higher at the part opposing the upstream part of the fuel flow channel than at the part opposing the downstream part of the fuel flow channel. It is therefore possible to suppress an increase in overvoltage in the part of the cathode-side power generating region opposing the upstream part of the fuel flow channel where a large amount of MCO occurs in continuous power generation. Further, an oxidant with a low humidity is supplied to the part of the oxidant flow channel opposing the upstream part of the fuel flow channel. Thus, the pores of the catalyst layer are unlikely to become clogged with water and the diffusibility of the oxidant is secured. As a result, it is possible to provide a direct oxidation fuel cell with excellent durability.

The flow direction of fuel and the flow direction of oxidant are preferably the same, as shown in FIG. 2. In this case, the concentration of the oxygen gas in the oxidant flow channel can be easily made higher at the part opposing the upstream part of the fuel flow channel than at the part opposing the downstream part of the fuel flow channel.

The flow direction of fuel and the flow direction of oxidant may be perpendicular to the gravity direction as shown in FIG. 2, or may be the same as the gravity direction.

Next, a description is made of the case where the flow direction of fuel and the flow direction of oxidant are the same as the gravity direction.

Embodiment 2

Figure 3:
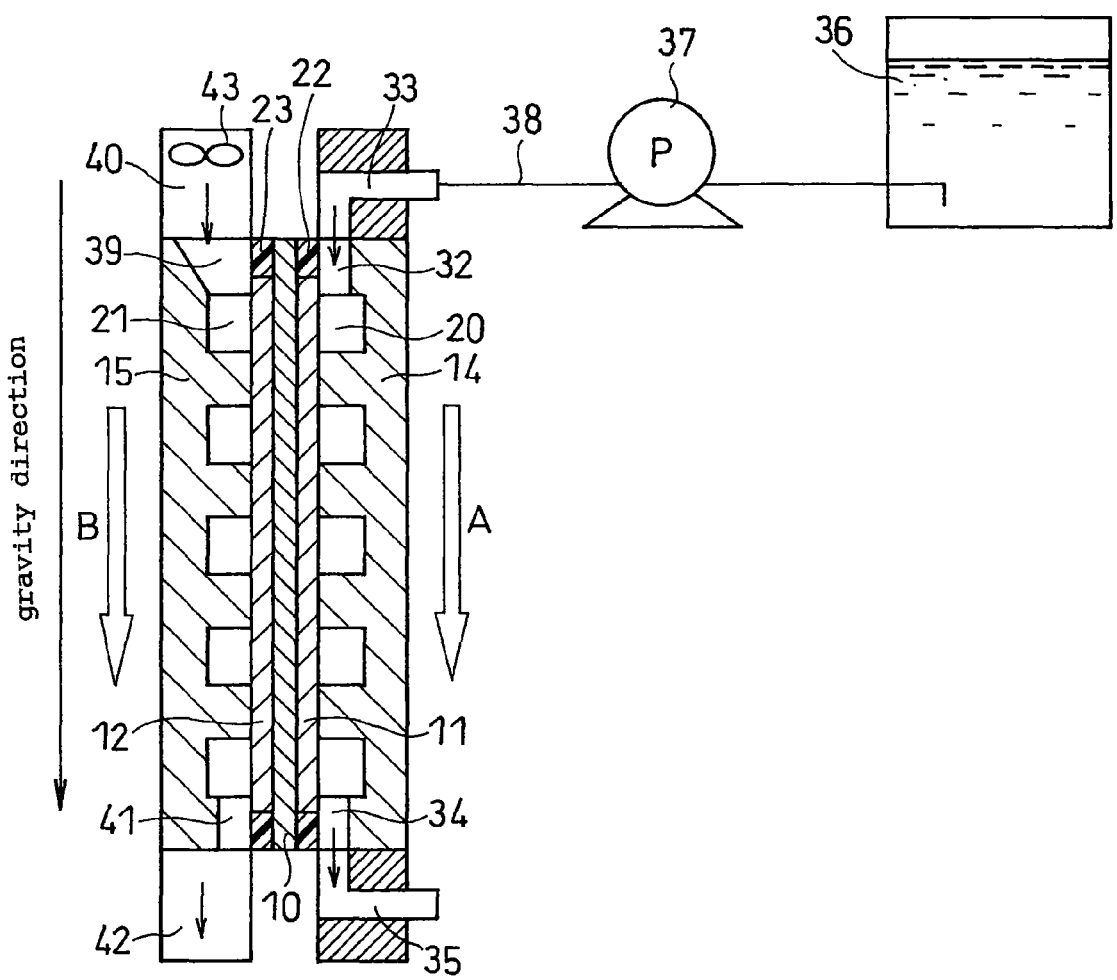
FIG. 3 is a schematic view showing the relation between the flow direction of fuel, the flow direction of oxidant, and the gravity direction in a direct oxidation fuel cell according to another embodiment of the invention.

Referring now to FIG. 3, the direct oxidation fuel cell of this embodiment is described. The fuel cell of this embodiment basically has the same unit cell structure as that of Embodiment 1, but the flow direction of fuel and the flow direction of oxidant are the same as the gravity direction. That is, the upstream part of the fuel flow channel and the upstream part of the oxidant flow channel are positioned upward in the gravity direction, and the downstream part of the fuel flow channel and the downstream part of the oxidant flow channel are positioned downward in the gravity direction.

FIG. 3 is a schematic longitudinal sectional view of the structure of the direct oxidation fuel cell of this embodiment. This structure is basically the same as that described with reference to FIG. 1 in Embodiment 1, so the description thereof is omitted.

FIG. 3 shows an example of the relation between the flow direction of fuel, the flow direction of oxidant, and the gravity direction in the direct oxidation fuel cell in this embodiment. In FIG. 3, the supply method of fuel and oxidant is also basically the same as in Embodiment 1.

In FIG. 3, the fuel inlet 32 of the anode-side separator 14 is connected to the fuel supply section 33 in the external manifold, and the fuel outlet 34 is connected to the fuel discharge section 35 in the external manifold.

The fuel in the fuel tank 36 is supplied to the fuel supply section 33 through the supply pipe 38 at a predetermined flow rate by the pump 37. Thereafter, the fuel flows through the power generating region, meandering along the fuel flow channel 20 of the anode-side separator 14. The fuel as a whole moves in the fuel flow direction A, which is the same as the gravity direction. Surplus fuel not utilized in power generation and carbon dioxide (reaction product) are discharged from the fuel discharge section 35.

The oxidant inlet 39 of the cathode-side separator 15 is connected to the oxidant supply section 40 in the external manifold, and the oxidant outlet 41 is connected to the oxidant discharge section 42 in the external manifold. The oxidant is supplied to the oxidant supply section 40 by using the oxidant supply unit 43. Thereafter, the oxidant flows through the power generating region, meandering along the oxidant flow channel 21 of the separator 15. The oxidant as a whole moves in the oxidant flow direction B, which is the same as the gravity direction. Surplus oxidant not utilized in power generation and produced water are discharged from the oxidant discharge section 42.

In this embodiment, also, the concentration of the oxygen gas contained in the oxidant lowers as the oxidant flows down through the oxidant flow channel. Hence, the concentration of the oxygen gas in the oxidant flow channel is higher at the part opposing the upstream part of the fuel flow channel than at the part opposing the downstream part of the fuel flow channel.

Further, in this embodiment, the flow directions of fuel and oxidant are the same as the gravity direction. Thus, the water removal in the part of the cathode-side power generating region opposing the upstream part of the fuel flow channel is improved. As a result, the pores of the cathode are prevented from becoming clogged with condensed water and the diffusibility of oxygen gas in the cathode is further improved. It is therefore possible to further improve the durability of the fuel cell.

Embodiment 3

In the fuel cell of this embodiment, the flow direction of fuel and the flow direction of oxidant are opposite, and an oxidant with a high oxygen gas concentration is separately supplied to the part of the oxidant flow channel opposing the upstream part of the fuel flow channel (i.e., the downstream part of the oxidant flow channel). In such a structure, the concentration of the oxygen gas in the oxidant flow channel becomes higher at the part opposing the upstream part of the fuel flow channel than at the part opposing the downstream part of the fuel flow channel.

The structure of the fuel cell used in this embodiment is basically the same as that of the fuel cell used in Embodiment 1, so the description thereof is omitted.

Figure 4:
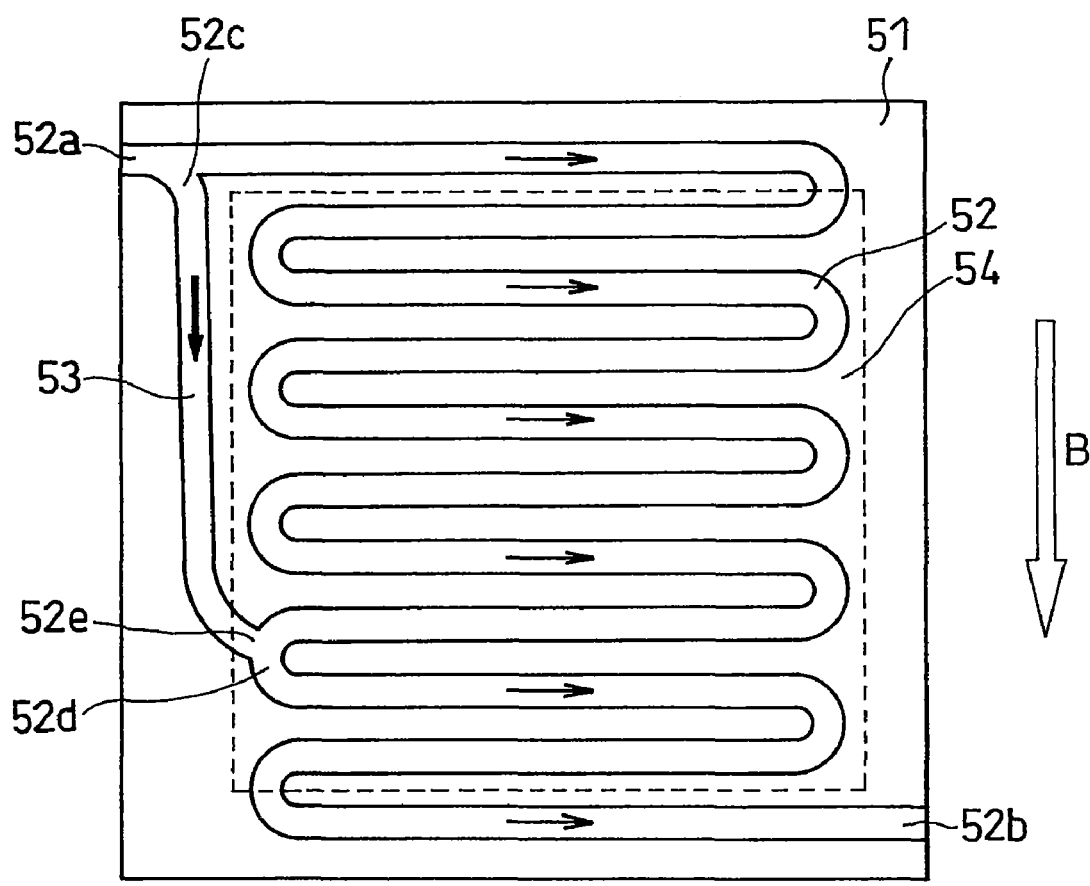
FIG. 4 is a front view of a cathode-side separator included in a direct oxidation fuel cell according to still another embodiment of the invention.

FIG. 4 is a front view of a cathode-side separator 51 included in the fuel cell of this embodiment. The face of the cathode-side separator 51 in contact with the cathode has an oxidant inlet 52a, an oxidant outlet 52b, and an oxidant flow channel 52 that connects the oxidant inlet 52a with the oxidant outlet 52b to distribute an oxidant. While the shape of the oxidant flow channel 52 is not particularly limited, it is preferably a serpentine path through the whole power generating region 54 in contact with the cathode 12 (the region surrounded by the dotted line).

This embodiment further includes a branch point 52c and a second oxidant inlet 52e. The branch point 52c is provided near the oxidant inlet 52a outside the power generating region 54. The second oxidant inlet 52e is provided in a curved part 52d, which is located downstream of the oxidant flow channel 52. The branch point 52c is connected to the second oxidant inlet 52e by an oxidant supply path 53. Since the oxidant supply path 53 is disposed outside the power generating region 54, an oxidant with a low humidity and a high oxygen gas concentration can be supplied to the part of the oxidant flow channel opposing the upstream part of the fuel flow channel (i.e., the downstream part of the oxidant flow channel).

The width of the oxidant supply path 53 is preferably 0.5 to 5 mm in term of reducing the pressure loss of oxidant flowing through the flow channel and securing electronic conductivity.

The oxidant supply path 53 may be one flow channel as shown in FIG. 4. Alternatively, two or more oxidant supply paths may be provided, and in this case, the respective flow paths may be connected to different curved parts or to the same curved part.

Figure 5:
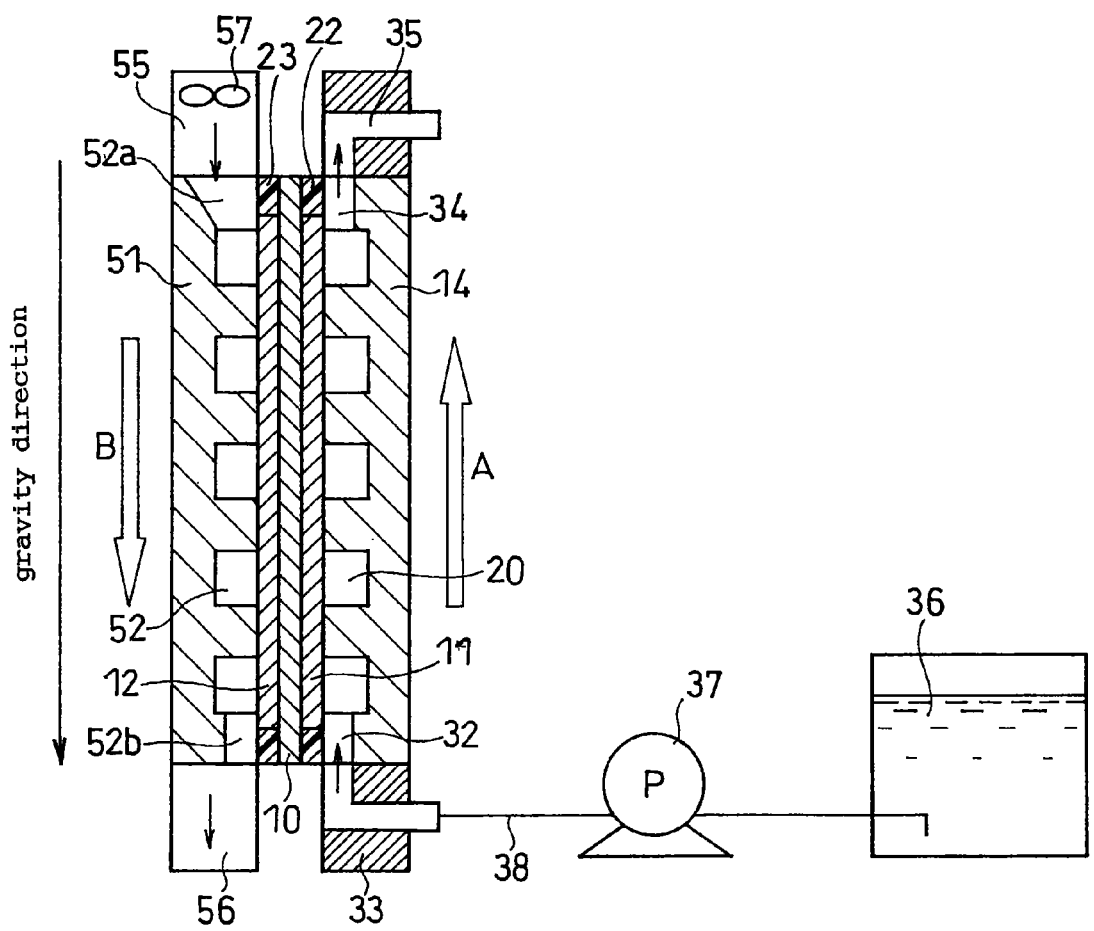
FIG. 5 is a schematic view showing the relation between the flow direction of fuel, the flow direction of oxidant, and the gravity direction in a direct oxidation fuel cell including the cathode-side separator illustrated in FIG. 4.

FIG. 5 shows one example of the relation between the flow direction of fuel, the flow direction of oxidant, and the gravity direction in a fuel cell including the cathode-side separator illustrated in FIG. 4. In the fuel cell of FIG. 5, the flow direction of fuel and the flow direction of oxidant are opposite, and the flow direction of oxidant and the gravity direction are the same. In the fuel cell of FIG. 5, the fuel inlet and the oxidant outlet are disposed in lower parts of the anode-side separator and the cathode-side separator, respectively, and the fuel outlet and the oxidant inlet are disposed in upper parts of the anode-side separator and the cathode-side separator, respectively.

The oxidant inlet 52*a* of the cathode-side separator 51 is connected to an oxidant supply section 55 in an external manifold installed on the periphery of the unit cell. The oxidant outlet 52*b* is connected to an oxidant discharge section 56 in an external manifold. The oxidant is supplied to the oxidant supply section 55 by using an oxidant supply unit 57 (e.g., a fan). Thereafter, the oxidant flows through the power generating region, meandering along the oxidant flow channel 52. Further, part of the oxidant branches off near the oxidant inlet, flows through the oxidant supply path outside the power generating region, and then supplied to the second oxidant inlet provided in the curved part downstream of the oxidant flow channel. In this embodiment, the oxidant as a whole moves in the direction B, which is opposite to the fuel flow direction A. Surplus oxidant not utilized in power generation and produced water are discharged from the oxidant discharge section 56.

The method of supplying fuel to the anode is the same as that in Embodiment 2 (FIG. 3) except that the flow direction of fuel is opposite to the gravity direction.

In such a structure, the concentration of the oxygen gas in the oxidant flow channel can be made higher at the part opposing the upstream part of the fuel flow channel than at the part opposing the downstream part of the fuel flow channel, and the oxygen gas concentration in the whole cathode-side power generating region can be maintained high. As a result, the cathode overvoltage becomes uniformly low in the power generating region, so that the durability of the fuel cell can be further improved.

In this embodiment, the flow directions of fuel and oxidant may be parallel to the gravity direction as shown in FIG. 5, or may be perpendicular to the gravity direction.

The foregoing Embodiments 1 to 3 have shown examples of a direct oxidation fuel cell in which external manifolds are installed on the periphery of the unit cell 1, but internal manifolds connected to the fuel flow channel and the oxidant flow channel may also be installed on the periphery of the separators and the MEA.

EXAMPLES

The invention is hereinafter described in detail by way of Examples, but these Examples are not to be construed as limiting in any way the invention.

Example 1

Pt—Ru alloy fine particles with a mean particle size of 3 nm (Pt:Ru weight ratio=2:1) were used as anode catalyst particles.

Pt-carrying conductive carbon particles with a mean particle size of 3 nm were used as cathode catalyst particles. Carbon black (ketjen black EC available from Mitsubishi Chemical Corporation) with a mean primary particle diameter of 30 nm was used as the conductive carbon particles. The amount of Pt was 50% by weight of the total of Pt and carbon black.

The anode catalyst particles were ultrasonically dispersed in an isopropanol aqueous solution. The resulting dispersion was mixed with a polymer electrolyte. The resulting mixture was highly dispersed in a bead mill to form an anode catalyst paste. The weight ratio of the catalyst particles to the polymer electrolyte contained in the anode catalyst paste was 1:1.

A cathode catalyst paste was prepared in the same manner as the anode catalyst paste except for the use of the cathode catalyst particles. The weight ratio of the catalyst particles to the polymer electrolyte contained in the cathode catalyst paste was 1:1.

The polymer electrolyte contained in the anode catalyst paste and the cathode catalyst paste was perfluorocarbon sulfonic acid ionomer (Flemion available from Asahi Glass Co., Ltd.)

Each of the anode catalyst paste and the cathode catalyst paste was applied onto a polytetrafluoroethylene sheet (Naflon PTFE sheet available from NICHIAS Corporation) using a doctor blade, and dried at 60° C. in the air for 2 hours. This gave an anode catalyst sheet with an anode catalyst layer on one face and a cathode catalyst sheet with a cathode catalyst layer on one face.

The respective catalyst sheets were cut to a size of 6 cm×6 cm. The cut catalyst sheets were laminated with the electrolyte membrane 2 interposed therebetween, so that their catalyst layers were in contact with the electrolyte membrane 2. The laminate was then thermally bonded by hot pressing (130° C., 7 MPa, 5 minutes). The electrolyte membrane 2 used was a perfluoroalkyl sulfonic acid ion-exchange membrane (Nafion 112 available from E. I. du Pont de Nemours and Company).

From the resulting assembly, the polytetrafluoroethylene sheets were removed to obtain a catalyst coated membrane assembly (CCM). The content of the Pt—Ru catalyst in the anode catalyst layer 7 was 5.8 mg/cm$^2$ and the content of the Pt catalyst in the cathode catalyst layer 9 was 1.3 mg/cm$^2$.

Next, the CCM was sandwiched between the anode diffusion layer 8 and the cathode diffusion layer 10 which were cut to a size of 6 cm×6 cm. The resulting laminate was bonded by hot pressing (130° C., 4 MPa, 3 minutes), so that the anode diffusion layer and the cathode diffusion layer were joined to the CCM.

The anode diffusion layer 8 used was carbon paper (TGP-H090 available from Toray Industries Inc.) On one face of the carbon paper was formed a water-repellent carbon layer (containing 40% by weight of polytetrafluoroethylene) with a thickness of approximately 30 μm. The carbon layer of the anode diffusion layer contained furnace black (Vulcan XC-72 available from Cabot Corporation) as the carbon material. The cathode diffusion layer 10 used was carbon cloth with a water-repellent carbon layer on one face (LT2500W available from E-TEK (now BASF Fuel Cell, Inc.). The anode diffusion layer and the cathode diffusion layer were laminated on the CCM in such a manner that their water-repellent carbon layers were in contact with the CCM.

Further, the gaskets 13 and 14 were thermally bonded (130° C., 4 MPa, 5 minutes) to the electrolyte membrane 2 around the anode 3 and the cathode 4, respectively, of the assembly obtained so as to sandwich the electrolyte membrane 2, in order to produce the membrane-electrode assembly (MEA). The gasket used was a three-layer laminate composed of a silicone rubber layer, a polyetherimide layer, and a silicone rubber layer.

This MEA was sandwiched between the separators 14 and 15, current collector plates 24 and 25, sheet heaters 26 and 27, insulator plates 28 and 29, and end plates 30 and 31, all of which had outer dimensions of 10 cm×10 cm. The resultant combination was secured with clamping rods to obtain a unit cell "a". The clamping pressure was set to 20 kgf per square centimeter of the area of the separator. The separators 14 and 15 were prepared from a resin-impregnated graphite material of 4 mm in thickness (G347B available from TOKAI CARBON CO., LTD.). The face of the separator 14 in contact with the anode and the face of the separator 15 in contact with the cathode had the serpentine fuel flow channel 11 and the serpentine oxidant flow channel 12, both of which had a width of 1.5 mm and a depth of 1 mm. The total length of each of the fuel flow channel 11 and the oxidant flow channel 12 was approximately 780 mm.

Gold-plated stainless steel plates were used as the current collector plates 24 and 25, and semicon heaters (available from SAKAGUCHI E.H. VOC CORP.) were used as the sheet heaters.

In the unit cell "a" produced in the above manner, as shown in FIG. 2, the upstream part of the fuel flow channel was opposed to the upstream part of the oxidant flow channel, and the flow direction of fuel and the flow direction of oxidant were the same. Further, the unit cell "a" was placed so that the flow direction of fuel and the flow direction of oxidant were perpendicular to the gravity direction. In this way, a direct oxidation fuel cell (fuel cell A) of Embodiment 1 was produced.

Example 2

In the unit cell "a" produced in Example 1, as shown in FIG. 3, the upstream part of the fuel flow channel was opposed to the upstream part of the oxidant flow channel, and the flow direction of fuel and the flow direction of oxidant were the same. Further, the unit cell "a" was placed so that the flow direction of fuel and the flow direction of oxidant were the same as the gravity direction. In this way, a direct oxidation fuel cell (fuel cell B) of Embodiment 2 was produced.

Example 3

A unit cell "b" was produced in the same manner as in Example 1, except for the use of the separator 51 illustrated in FIG. 4 as the cathode-side separator. The separator 51 has the oxidant supply path 53 connected to the second oxidant inlet 52e, which is located at the curved part 52d downstream of the oxidant flow channel 52. The width, depth, and total length of the oxidant flow channel of the cathode-side separator 51 were the same as those in Example 1. The oxidant supply path had a width of 1.5 mm, a depth of 1 mm, and a total length of approximately 60 mm.

In this unit cell "b", as shown in FIG. 5, the flow direction of fuel and the flow direction of oxidant were opposite. The unit cell "b" was placed so that the flow direction of oxidant and the gravity direction were the same. In this way, a direct oxidation fuel cell of Embodiment 3 (fuel cell C) was produced.

Comparative Example 1

In the unit cell "a" produced in Example 1, the upstream part of the fuel flow channel was opposed to the downstream part of the oxidant flow channel, and the flow direction of fuel was opposite to the flow direction of oxidant. Further, the unit cell "a" was placed so that the flow direction of fuel and the flow direction of oxidant were perpendicular to the gravity direction. In this way, a comparative fuel cell 1 was produced.

Comparative Example 2

In the unit cell "a" produced in Example 1, the upstream part of the fuel flow channel was opposed to the downstream part of the oxidant flow channel, and the flow direction of fuel was opposite to the flow direction of oxidant. Further, the unit cell "a" was placed so that the flow direction of oxidant was the same as the gravity direction. In this way, a comparative fuel cell 2 was produced.

The fuel cells A to C produced in Examples 1 to 3 and the fuel cells 1 to 2 produced in Comparative Examples 1 to 2 were evaluated for their durability in the following manner.

[Evaluation]
(1) Durability

A 4M methanol aqueous solution was supplied to the anode at a flow rate of 0.2 ml/min, while air was supplied to the cathode at a flow rate of 0.2 L/min. At a cell temperature of 60° C., each fuel cell was operated to generate power at a voltage of 0.4 V. From the current density after 4 hours of power generation and the voltage value, power density was calculated, and the obtained value was used as initial power density.

Thereafter, each fuel cell was continuously operated to generate power at a voltage of 0.4 V for 1000 hours. From the current density after the 1000 hours and the voltage value, power density after the 1000 hours was calculated. The ratio of the power density after the 1000 hours to the initial power density was defined as power density retention rate. The results are shown in Table 1, in which power density retention rate is expressed as a percentage. Table 1 also shows the flow directions of fuel and oxidant and presence or absence of the second oxidant inlet connected to the oxidant supply path.

TABLE 1

| | Flow directions of fuel and oxidant (Flow direction of oxidant relative to gravity direction) | Durability | | |
|---|---|---|---|---|
| | | Presence or absence of second oxidant inlet | Initial power density (mW/cm$^2$) | Power density retention rate (%) |
| Fuel cell A | Same direction (perpendicular to gravity direction) | Absent | 68 | 92 |
| Fuel cell B | Same direction (Same as gravity direction) | Absent | 68 | 96 |
| Fuel cell C | Opposite direction (Same as gravity direction) | Present | 70 | 98 |
| Fuel cell 1 | Opposite direction (Perpendicular to gravity direction) | Absent | 60 | 56 |
| Fuel cell 2 | Opposite direction (Same as gravity direction) | Absent | 62 | 73 |

As shown in Table 1, the power density retention rates of the fuel cells A to C were very high. In the invention, since the oxygen gas concentration at the part of the oxidant flow channel opposing the upstream part of the fuel flow channel is high, an increase in cathode overvoltage due to oxidation of crossover methanol can be suppressed. Further, since oxygen gas with a low humidity can be supplied to the part of the oxidant flow channel opposing the upstream part of the fuel flow channel, the pores of the catalyst layer are unlikely to become clogged with water and the diffusibility of oxygen gas can be maintained over an extended period of time. As a result, the durability of the fuel cells can be dramatically improved.

Contrary to this, the power density retention rates of the comparative fuel cells 1 to 2 were significantly lower than those of the fuel cells A to C. In these comparative fuel cells, since the flow direction of fuel and the flow direction of oxidant are opposite, the oxygen gas concentration at the part of the oxidant flow channel opposing the upstream part of the fuel flow channel is low. In this case, due to the effects of water accumulation in the cathode, carbon dioxide production, etc, the diffusibility of oxygen gas in the MEA lowers, and the resulting decrease in current density causes an increase in MCO. As a result, when power is generated for an extended period of time, the cathode overvoltage increases significantly compared with the initial stage of power generation. Probably for this reason, the durability of the comparative fuel cells 1 to 2 lowered.

The direct oxidation fuel cell of the invention can directly use a fuel such as methanol or dimethyl ether without reforming it into hydrogen, and has excellent durability. It is therefore useful, for example, as the power source for portable small-sized electronics such as cellular phones, personal digital assistants (PDA), notebook PCs, and video cameras. Also, the direct oxidation fuel cell of the invention can be used as the power source for electric scooters, etc.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A direct oxidation fuel cell comprising at least one unit cell, said unit cell including:
   a membrane-electrode assembly comprising an electrolyte membrane sandwiched between an anode and a cathode, each of said anode and said cathode including a catalyst layer and a diffusion layer;
   an anode-side separator with a fuel flow channel for supplying an aqueous solution of organic fuel to said anode; and
   a cathode-side separator with an oxidant flow channel for supplying an oxidant containing oxygen gas to said cathode,
   wherein said fuel flow channel and said oxidant flow channel are so structured that the flow direction of said aqueous solution of organic fuel and the flow direction of said oxidant are the same, and the concentration of the oxygen gas in said oxidant flow channel is higher at a part opposing an upstream part of said fuel flow channel than at a part opposing a downstream part of said fuel flow channel.

2. The direct oxidation fuel cell in accordance with claim 1, wherein the flow direction of said aqueous solution of organic fuel and the flow direction of said oxidant are the same as the gravity direction.

3. A method for operating a direct oxidation fuel cell
   said method using the direct oxidation fuel cell of claim 1, said method comprising the step of supplying said aqueous solution of organic fuel and said oxidant to said fuel flow channel and said oxidant flow channel, respectively, so that the concentration of the oxygen gas in said oxidant flow channel is higher at a part opposing an upstream part of said fuel flow channel than at a part opposing a downstream part of said fuel flow channel.

4. The direct oxidation fuel cell in accordance with claim 1, further comprising a fuel tank containing said aqueous solution of organic fuel to be supplied to said fuel flow channel.

5. A direct oxidation fuel cell comprising at least one unit cell, said unit cell including:
   a membrane-electrode assembly comprising an electrolyte membrane sandwiched between an anode and a cathode, each of said anode and said cathode including a catalyst layer and a diffusion layer;
   an anode-side separator with a fuel flow channel for supplying an aqueous solution of organic fuel to said anode; and
   a cathode-side separator with an oxidant flow channel for supplying an oxidant containing oxygen gas to said cathode,
   wherein said fuel flow channel and said oxidant flow channel are so structured that the flow direction of said aqueous solution of organic fuel and the flow direction of said oxidant are opposite, and the concentration of the oxygen gas in said oxidant flow channel is higher at a part opposing an upstream part of said fuel flow channel than at a part opposing a downstream part of said fuel flow channel.

6. A method for operating a direct oxidation fuel cell, said method using the direct oxidation fuel cell of claim 5, said method comprising the step of supplying said aqueous solution of organic fuel and said oxidant to said fuel flow channel and said oxidant flow channel, respectively, so that the concentration of the oxygen gas in said oxidant flow channel is higher at a part opposing an upstream part of said fuel flow channel than at a part opposing a downstream part of said fuel flow channel.

7. The direct oxidation fuel cell in accordance with claim 5, further comprising a fuel tank containing said aqueous solution of organic fuel to be supplied to said fuel flow channel.

* * * * *